(12) United States Patent
McKinley et al.

(10) Patent No.: US 9,567,899 B2
(45) Date of Patent: Feb. 14, 2017

(54) LIGHT TOWER ASSEMBLY

(71) Applicants: Stephen C. McKinley, Soldotna, AK (US); Kevin L. Feguson, Soldotna, AK (US); Keith Hilbish, Soldotna, AK (US); Jon Warner, Soldotna, AK (US)

(72) Inventors: Stephen C. McKinley, Soldotna, AK (US); Kevin L. Feguson, Soldotna, AK (US); Keith Hilbish, Soldotna, AK (US); Jon Warner, Soldotna, AK (US)

( * ) Notice: Subject to any disclaimer, the term of this patent is extended or adjusted under 35 U.S.C. 154(b) by 121 days.

(21) Appl. No.: 14/545,212

(22) Filed: Apr. 8, 2015

(65) Prior Publication Data

US 2016/0109079 A1  Apr. 21, 2016

Related U.S. Application Data

(60) Provisional application No. 62/122,412, filed on Oct. 20, 2014.

(51) Int. Cl.
| | |
|---|---|
| *F21S 8/08* | (2006.01) |
| *F21S 9/04* | (2006.01) |
| *F21V 14/02* | (2006.01) |
| *F21V 21/22* | (2006.01) |
| *F21V 21/30* | (2006.01) |
| *F02B 63/04* | (2006.01) |
| *H02K 7/00* | (2006.01) |
| *H02K 9/04* | (2006.01) |
| *H02K 7/18* | (2006.01) |
| *F21S 2/00* | (2016.01) |
| *F21W 131/403* | (2006.01) |
| *H02K 7/10* | (2006.01) |

(52) U.S. Cl.
CPC .............. *F02B 63/047* (2013.01); *F21S 8/085* (2013.01); *F21V 14/02* (2013.01); *F21V 21/22* (2013.01); *F21V 21/30* (2013.01); *H02K 7/003* (2013.01); *H02K 9/04* (2013.01); *F21S 2/005* (2013.01); *F21W 2131/403* (2013.01); *H02K 7/1004* (2013.01); *H02K 7/1815* (2013.01)

(58) Field of Classification Search
CPC .......... F21V 14/02; F21V 21/22; F21V 21/26; F21V 21/28; F21V 21/30; F21S 8/085; F21S 8/086; F21S 8/088; F21S 2/005; F21S 9/04; F21W 2131/403
See application file for complete search history.

(56) References Cited

U.S. PATENT DOCUMENTS

| | | | | |
|---|---|---|---|---|
| 3,264,465 | A | * 8/1966 | Rex | ......................... F21S 8/086 250/215 |
| 4,181,929 | A | 1/1980 | Barber | |
| 5,272,611 | A | * 12/1993 | Lai | ......................... F21S 8/088 174/50 |
| 5,550,333 | A | 8/1996 | Whiteman, Jr. | |

(Continued)

*Primary Examiner* — Alan Cariaso
(74) *Attorney, Agent, or Firm* — Randal D. Homburg

(57) ABSTRACT

A light tower assembly for the high density illumination of an indoor or outdoor area by a portable power plant or a stationary power source includes at least one vertical support shaft, at least one cross member attached to the vertical support shaft and at least on omnidirectional heavy duty LED light bracket attached to the cross member, providing support to a high lumen LED light, with the heavy duty LED light bracket being moveably aimed within a range of 360 degrees from a pivotal mounting point on the cross member.

3 Claims, 5 Drawing Sheets

(56) References Cited

U.S. PATENT DOCUMENTS

| | | | |
|---|---|---|---|
| 5,806,963 A | 9/1998 | Miller | |
| D399,595 S | 10/1998 | Miller | |
| 6,517,225 B1 | 2/2003 | Allen | |
| 6,805,462 B1 | 10/2004 | Smith | |
| D573,286 S | 7/2008 | Zettl | |
| 7,988,343 B2 | 8/2011 | Palmisano, Jr. | |
| 8,025,428 B2 * | 9/2011 | Duguay | F21S 8/086 362/249.02 |
| D646,840 S | 10/2011 | Polka | |
| 8,172,438 B2 | 5/2012 | Konop | |
| 8,342,714 B1 | 1/2013 | Rea | |
| 8,734,163 B1 * | 5/2014 | Gordin | G09B 25/02 434/367 |
| 8,931,932 B2 * | 1/2015 | Lipscomb | F21V 31/03 362/362 |
| 9,103,495 B2 * | 8/2015 | Intravatola | F16M 11/10 |
| 2008/0129543 A1 * | 6/2008 | Lee | G08G 1/0955 340/908 |

* cited by examiner

LIGHT TOWER ASSEMBLY

CROSS REFERENCE TO RELATED APPLICATIONS

Applicants claim the benefit of U.S. Provisional Patent Application No. 62/122,412, filed by the same inventors on Oct. 20, 2014.

I. BACKGROUND OF THE INVENTION

1. Field of Invention

A light tower assembly for the high density illumination of an indoor or outdoor area by a portable power plant or a stationary power source includes at least one vertical support shaft, at least one cross member attached to the vertical support shaft and at least on omnidirectional heavy duty LED light bracket attached to the cross member, providing support to a high lumen LED light, with the heavy duty LED light bracket being moveably aimed within a range of 360 degrees from a pivotal mounting point on the cross member.

2. Description of Prior Art

A preliminary review of prior art patents was conducted by the applicant which reveal prior art patents in a similar field or having similar use. However, the prior art inventions do not disclose the same or similar elements as the present light tower assembly, nor do they present the material components in a manner contemplated or anticipated in the prior art.

II. SUMMARY OF THE INVENTION

Portable light towers are utilized in the industry to illuminate large areas where insufficient light is provided to safely conduct construction projects. These light towers are commonly seen at highway construction projects being operated at night, at oil field drilling operations where drilling operations are conducted around the clock, off-shore rigs and in arenas where sporting events are held at venues that do not provide stationary or permanent lighting equipment. These light towers are also used indoors for construction of large capacity building projects, within underground location involved in mining, boring or where underground transportation projects are being performed.

The present light tower assembly defines a vertical shaft which is mounted to the trailer frame or a stationary support stand and extends upward. It may be provided with a telescoping means, elevated by either an electrical winch drive or manual cable drive ratchet and locking means. At the top of the light tower assembly, at least one cross member having at least one LED light assembly is attached. The LED light assembly comprises at least one, but preferably four LED light brackets, each bracket mounting an LED light. Each LED light bracket is independently capable of movement on a 360 degree vertical axis, with each LED light being rotated on a 360 degree horizontal axis, providing each light fixture with the independent capacity of movement and aiming of the LED light fixture to any point within a three dimensional 360 degree target area, thus making each LED light fixture truly omni-directional.

The selection of LED lighting is an energy efficient, cost reducing option over the typically used metal halide light fixture, which require considerable more operational power, give off a considerable amount of heat which is a loss of energy efficiency and waste of power, and have a vastly extended life expectancy over metal halide bulbs and fixtures.

In outdoor testing performed on the type of LED light fixtures used in the present high efficiency light tower, LED lighting has demonstrated comparable illumination to metal halides in most work environments. LEDs are shown to maintain 80% of their factory illumination over a period of 50,000 hours, with no mercury, UV or IR wave production. LED bulbs are flicker free and illuminate instantly with high lumen uniformity and color clarity rendering. They are also lighter and more resistant to shock, vibration and weather changes than metal halide bulbs. At a distance of 400 feet, the 400 watt LED lights are as bright as 1000 watt metal halide bulbs and also provide peripheral lighting equal to metal halides of the focal center. In indoor lighting use, the LED light fixtures distribute a more even lighting to vertical surfaces, produce far less heat than metal halides and are observed by workers to be easier to work within than metal halide illumination in working conditions.

III. DESCRIPTION OF THE DRAWINGS

The following drawings are submitted with this utility patent application.

IV. DESCRIPTION OF THE PREFERRED EMBODIMENT

Figure 1:
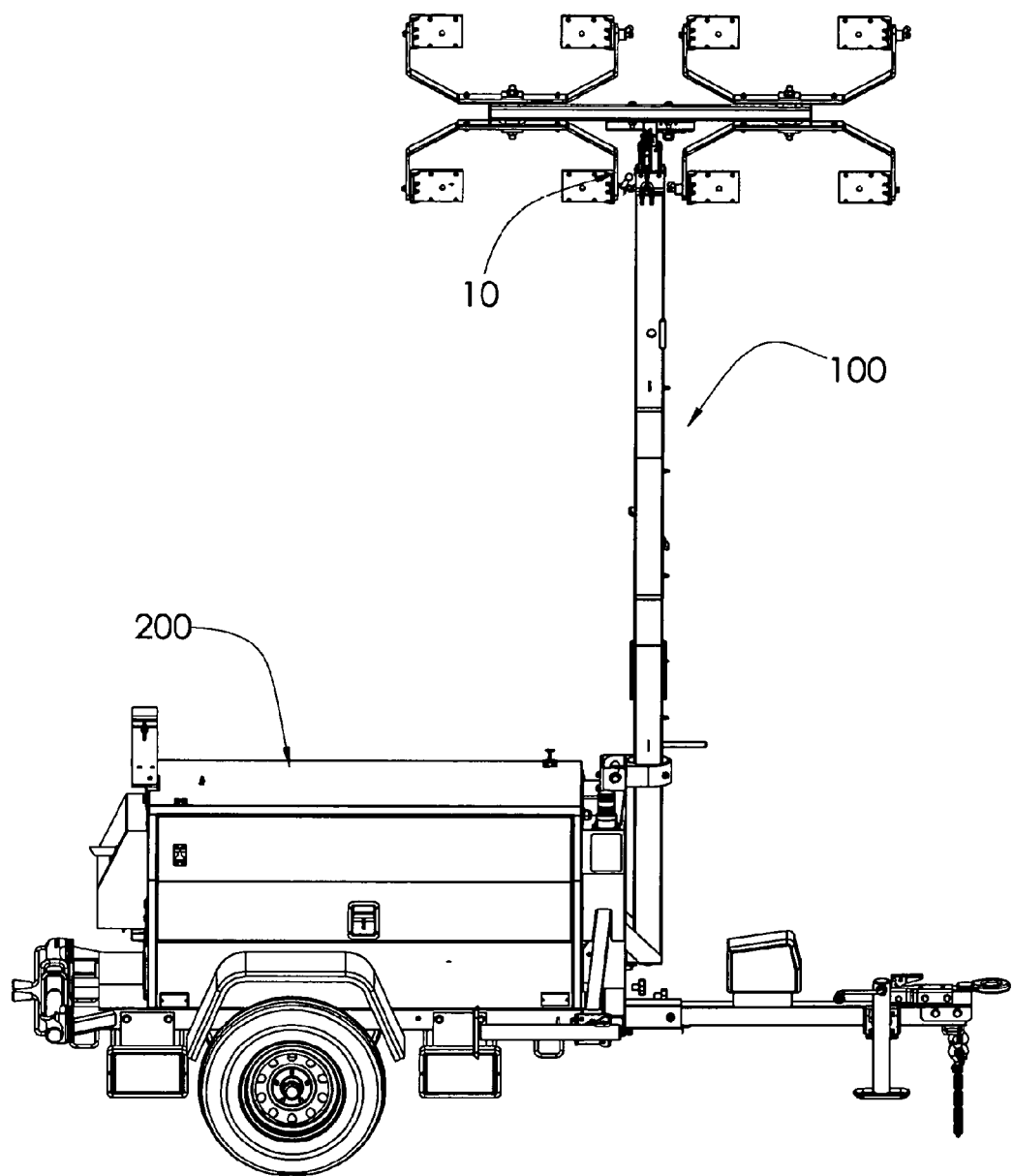
FIG. 1 is an illustration of an embodiment of the light tower assembly mounted to a portable power plant.
Figure 2:
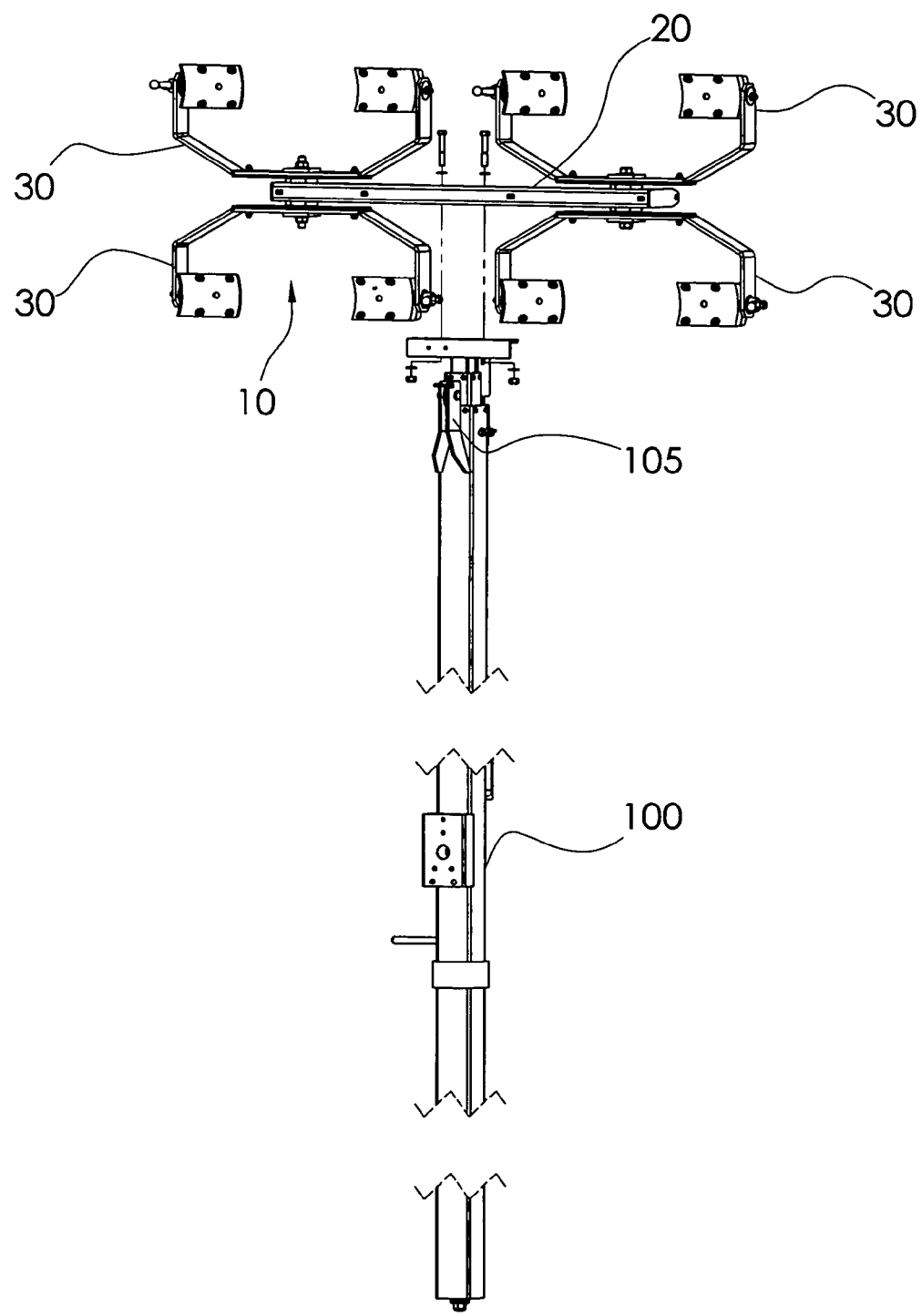
FIG. 2 is an illustration of the light tower assembly attached to a vertical extension support

As shown in FIGS. 1-8, the light tower assembly 10 includes at least one vertical shaft which is mounted to a portable power plant generator trailer frame 200, FIG. 1, or a stationary stand near an electrical power supply, not shown, with the at least one vertical shaft 100 provided in one embodiment as being a telescopic vertical shaft, FIG. 2, with the capacity to be raised or lowered by either an electrical winch drive or manual cable drive ratchet and locking means 105. At the top of the at least one vertical shaft 100, the light tower assembly 10 is attached, with at least one cross member 20 is attached, each cross member 20 defining at least one vertical bore 24, attaching at least one omnidirectional LED light bracket assembly 30. Each at least one LED light bracket assembly 30 comprises an LED light bracket 40 pivotally mounting a pair of module mounting frame members 80 which pivotally secures at least one LED light module 60. Each LED light bracket 40 is independently capable of movement on a 360 degree vertical axis, with each LED light module mounting frame member 80 being fixable and rotatable on a 360 degree horizontal axis, providing each at least one LED light bracket assembly 30 with the independent capability of movement and target aiming directed at any location within a three dimensional 360 degree area, thus making each LED light bracket assembly 30 truly omni-directional.

The selection of LED lighting is an energy efficient, cost reducing option over the typically used metal halide light fixture, which require considerable more operational power, give off a considerable amount of heat which is a loss of energy efficiency and waste of power, and have a vastly extended life expectancy over metal halide bulbs and fixtures. In outdoor testing performed on the type of LED lighting components used in the present high efficiency light tower, LED lighting has demonstrated comparable illumination to metal halides in most work environments. LED are shown to maintain 80% of their factory illumination over a period of 50,000 hours, with no mercury, UV or IR wave production. LED bulbs are flicker free and illuminate instantly with high lumen uniformity and color clarity rendering. They are also lighter and more resistant to shock, vibration and weather changes than metal halide bulbs. At a distance of 400 feet, the 400 watt LED lights are as bright as 1000 watt metal halide bulbs and also provide peripheral lighting equal to metal halides of the focal center. In indoor lighting use, the LED light array distribute a more even lighting to vertical surfaces, produce far less heat than metal halides and are observed by workers to be easier to work within than metal halide illumination in working conditions.

Figure 5:
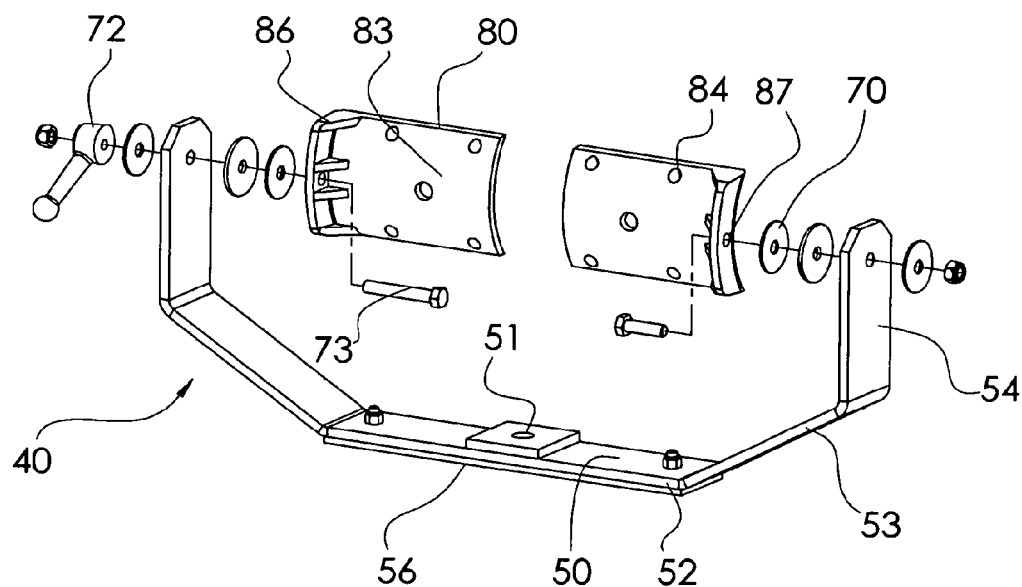
FIG. 5 is an expanded view of an isolated light bracket assembly.
Figure 6:
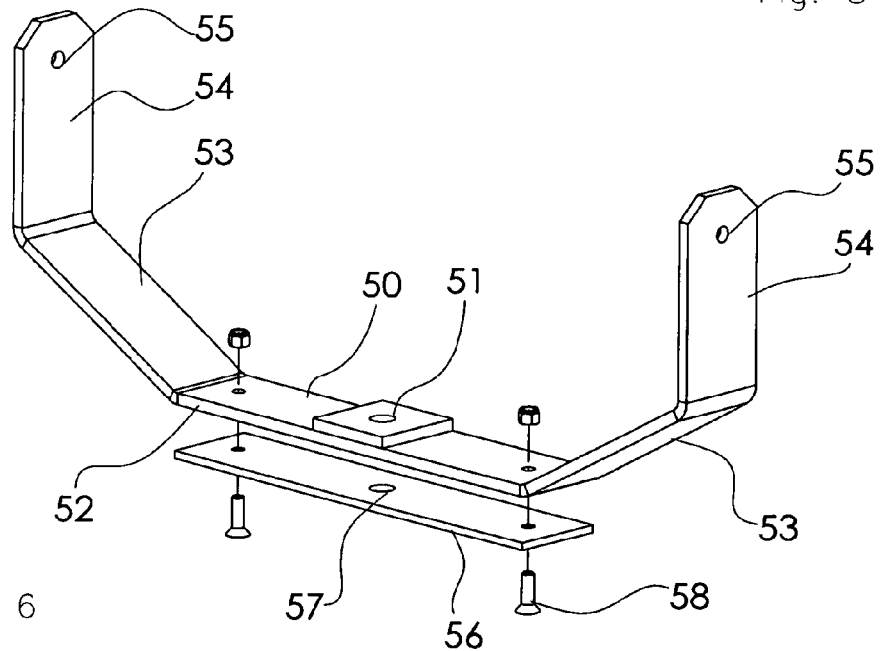
FIG. 6 is a lower support bar and lower reinforcement with connecting means.
Figure 7:
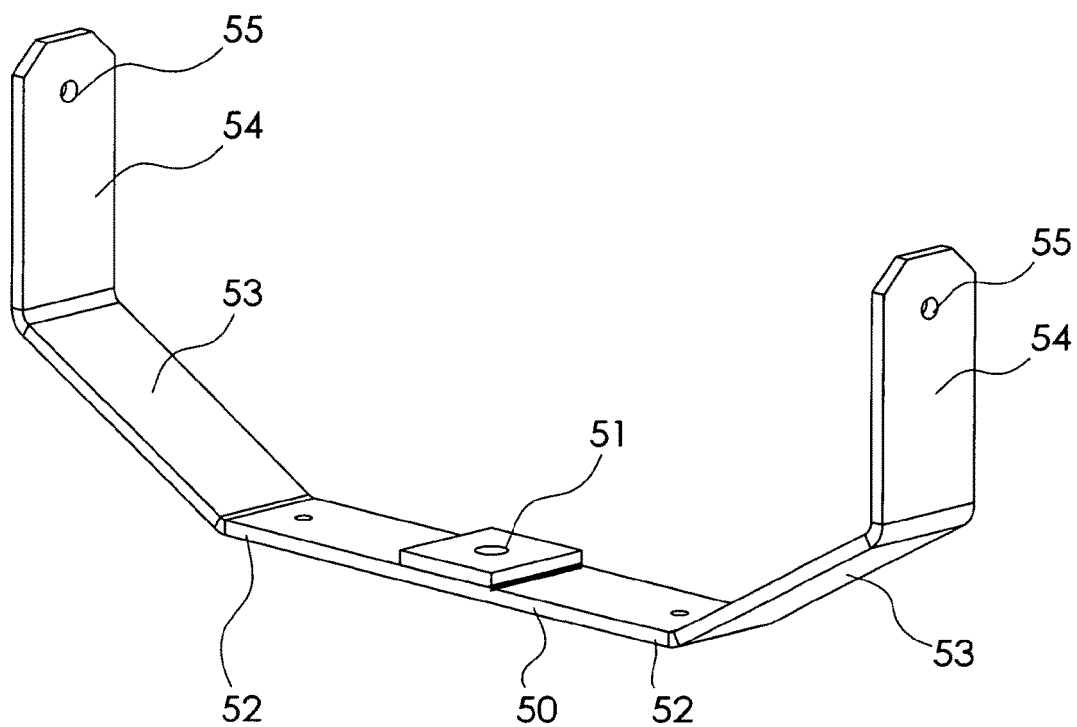
FIG. 7 is the lower support bar.

Each LED light bracket 40 further defines a heavy duty lower support bar 50 having a central bore 51 and opposing ends 52 defining an angular portion 53 and a vertical portion 54, each vertical portion 54 defining a mounting frame securing bore 55. A lower reinforcement is attached to the lower support bar for added strength, the lower reinforcement 56 having a central bore 57 and a connecting means 58 to the lower support bar. A locking bolt, washers and a nut 70 secure each central bore 51 of each light bracket 40 through the vertical bore 24 located in the at least one cross member 20, as shown in FIGS. 2-5. Each mounting frame securing bore 55 independently accepts a threaded shaft 73 of a locking member 72 which independently secures through a lateral bore 87 of a lateral flange 86 of each module mounting frame member 80, shown in FIGS. 4 and 5. The module mounting frame member further defines a rear surface 83, FIG. 5, presenting a plurality of module bolt holes 84 and extending the lateral flange 86.

Figure 3:
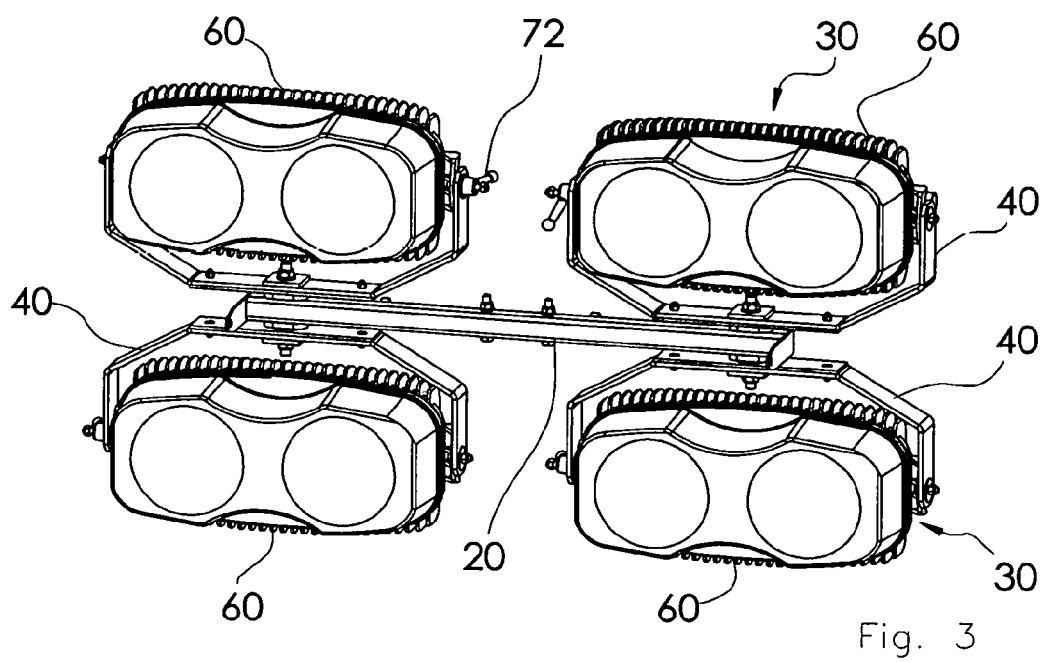
FIG. 3 is a drawing of the light tower assembly with four LED light modules pointing in a common direction.
Figure 4:
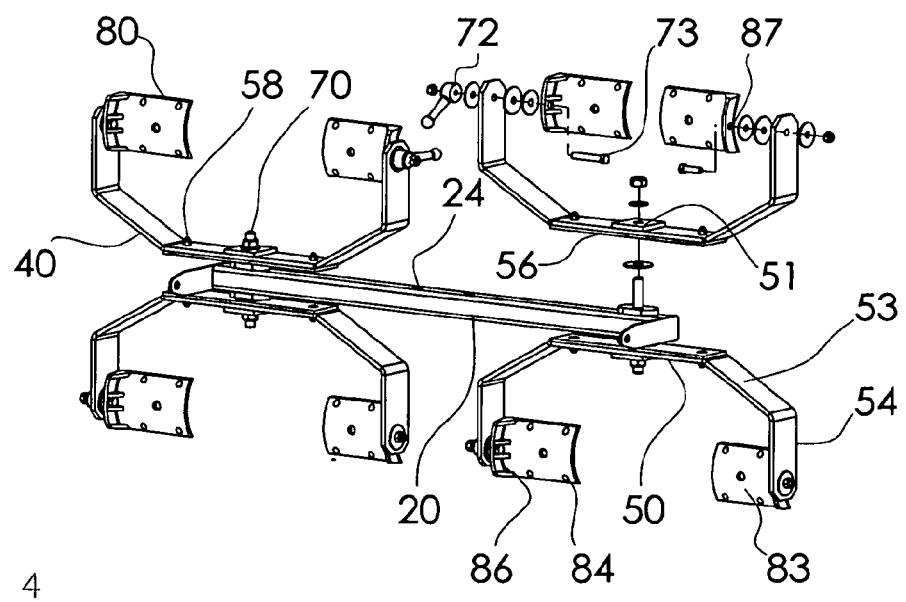
FIG. 4 is an expanded view of the light bracket assembly without the LED lights mounted within the brackets.
Figure 8:
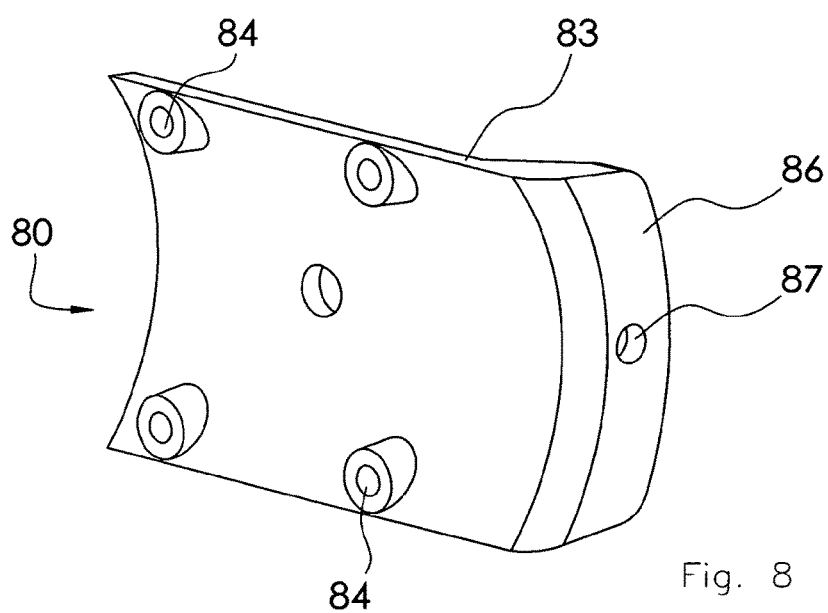
FIG. 8 is the front surface of the module mounting frame member

Each module mounting frame member 80 is further secured to a rear surface 62 of the LED light module, FIGS. 3 and 8. By providing each light bracket 40 in the disclosed embodiment, the omni-directional aiming and illumination of the LED light bracket assembly 10 is accomplished, especially where there are at least four light bracket assemblies 30 attached to a single cross member 20, and even more so where there are two cross members with four LED light bracket assemblies for a total of eight independently aimed LED light modules, FIGS. 1-2.

While the invention has been particularly shown and described with reference to a preferred embodiment thereof, it will be understood by those skilled in the art that changes in form and detail may be made therein without departing from the spirit and scope of the invention.

What is claimed is:

1. A light tower assembly mounted to a portable power plant generator or stationary electrical power supply comprising:
   at least one vertical shaft;
   at least one cross member attached to the at least one vertical shaft by at least one vertical bore; and
   one or more omnidirectional LED light bracket assemblies, each said assembly providing an LED light bracket pivotally mounting a pair of module mounting frame members which pivotally secure at least one LED light module per each said pair of module mounting members, each said LED light bracket further defining a heavy duty lower support bar having a central bore and opposing ends defining an angular portion and a vertical-portion, each vertical portion defining a mounting frame securing bore, each said mounting frame securing bore independently accepting a threaded shaft of a locking member which independently secures through a lateral bore of a lateral flange of each said module mounting frame member within each said pair of module mounting frame members;
   a lower reenforcement attached to said lower support bar for added strength, said lower reenforcement defining a central bore and a connecting means attaching said lower reinforcement to said lower support bar;
   a locking bolt, washers and a nut securing each said central bore of each said light bracket through a vertical bore located in within said at least one cross member, wherein each said LED light bracket is independently capable of movement on a 360 degree vertical axis and each said pair of LED light module mounting frame members being fixable and rotatable on a 360 degree horizontal axis, providing each said one or more LED light bracket assembly with an independent capability of omnidirectional movement and target aiming directed at any location within a three dimensional 360 degree area.

2. The light tower assembly of claim 1, further comprising:
   said at least one vertical shaft is a telescopic shaft having a means of raising and lowering said at least one vertical shaft.

3. The light tower assembly of claim 1, further comprising:
   each module mounting frame member further defining a rear surface presenting a plurality of module bolt holes and extending a lateral flange, secured to said LED light module providing said LED light module with the capacity for omni-directional aiming and illumination of the LED light bracket assembly; and
   said light tower assembly provides four said light bracket assemblies attached to two said independent cross members for a total of eight independently aimed LED light modules.

* * * * *